US009887025B2

(12) United States Patent
Driscoll et al.

(10) Patent No.: US 9,887,025 B2
(45) Date of Patent: Feb. 6, 2018

(54) HIGH TEMPERATURE SUPERCONDUCTOR WIRE BUNDLING SYSTEM AND METHOD

(71) Applicant: American Superconductor Corporation, Devens, MA (US)

(72) Inventors: Glenn C. Driscoll, Haverhill, MA (US); Henry C. Valcour, III, Upton, MA (US); Paul Yankauskas, Lunenburg, MA (US); Daniel B. George, II, Homer City, PA (US); Alan W. Baum, Homer City, PA (US); Timothy G. Freidhoff, Johnstown, PA (US); Bryan P. Tipton, Johnstown, PA (US); Patricia D. Huber, Lincoln University, PA (US)

(73) Assignee: American Superconductor Corporation, Devens, MA (US)

( * ) Notice: Subject to any disclaimer, the term of this patent is extended or adjusted under 35 U.S.C. 154(b) by 234 days.

(21) Appl. No.: 14/870,511

(22) Filed: Sep. 30, 2015

(65) Prior Publication Data

US 2017/0092392 A1 Mar. 30, 2017

(51) Int. Cl.
*H01B 12/02* (2006.01)
*H01B 12/06* (2006.01)
*H01B 13/02* (2006.01)

(52) U.S. Cl.
CPC ......... *H01B 13/0278* (2013.01); *H01B 12/02* (2013.01); *H01B 13/0257* (2013.01); *H01B 12/06* (2013.01); *Y02E 40/642* (2013.01)

(58) Field of Classification Search
CPC ........ H01B 12/02–12/06; H01B 13/00–13/03; H01B 12/00–13/0278; H02K 55/00; H02K 31/00; H02K 16/00
See application file for complete search history.

(56) References Cited

U.S. PATENT DOCUMENTS 4,214,430 A * 7/1980 Vogelsberg ............ G02B 6/449 57/293
4,599,853 A * 7/1986 Varga-Papp ....... H01B 13/0221 57/13
4,929,047 A * 5/1990 Dubots ................ G02B 6/4402 156/161

FOREIGN PATENT DOCUMENTS

DE 4212009 A1 10/1993

OTHER PUBLICATIONS

International Search Report with Written Opinion, dated Dec. 5, 2016 received in international patent application No. PCT/US2016/052611, 7 pages.

* cited by examiner

*Primary Examiner* — Colleen P Dunn
(74) *Attorney, Agent, or Firm* — Verrill Dana, LLP; John W. Powell

(57) ABSTRACT

A system for bundling a plurality of high temperature superconductor tapes into a flexible cable, includes a first alignment device for receiving and guiding there through the plurality of high temperature superconductor tapes, each of the tapes arranged with a wide surface oriented at a first angle. There is a second alignment device for receiving and guiding there through the plurality of high temperature superconductor tapes, each of said tapes arranged with the wide surface oriented at a second angle. The first angle is transverse to the second angle and plastically deforms the tapes to impart a twist pitch in the tapes. There is a forming member spaced from the second alignment device for receiving the plurality of high temperature superconductor tapes with the imparted twist pitch and forming them into a bundle of high temperature superconductor tapes of the high temperature superconductor tapes with the imparted twist pitch.

22 Claims, 5 Drawing Sheets

10

12b 16 18 22 24 26 12a 15 23 20 14b 14a

HIGH TEMPERATURE SUPERCONDUCTOR WIRE BUNDLING SYSTEM AND METHOD

The present invention was developed under Contract No. N00014-10-D-0062with the United States Navy.

FIELD OF INVENTION

The present invention relates to a wire bundling system and method for making a flexible power cable and more particularly for such a system and method for bundling a plurality of high temperature superconductor ("HTS") wires/tapes into a flexible power cable.

BACKGROUND

Bundling a plurality of HTS wires/tapes to make a flexible power cable is advantageous for numerous power applications. The terms wire and tape may be used interchangeably to describe a conductor with a rectangular cross-section geometry having a substantial width relative to its thickness. Loosely bundling multiple HTS wires together, so they can be packaged in cryostat for thermal and electrical isolation as well as cryogenic cooling and physical protection, is desirable.

However, to date, achieving an economical and efficient bundling process for HTS wire has proven to be a challenge due to the rectangular cross-sectional geometry of the individual strands of wire. Existing cabling equipment is generally suited for conventional round wires and is not well suited for the rectangular cross-sectional area associated with HTS wires.

SUMMARY

In one aspect, the invention features a system for bundling a plurality of high temperature superconductor tapes into a flexible cable. There is first alignment device for receiving and guiding there through the plurality of high temperature superconductor tapes, each of the plurality of tapes is arranged side by side with a wide surface of each of the plurality of high temperature superconductor tapes oriented at a first angle. There is a second alignment device spaced from the first alignment device for receiving and guiding there through the plurality of high temperature superconductor tapes, each of the tapes arranged side by side with the wide surface of each of the plurality of high temperature superconductor tapes oriented at a second angle. The first angle being transverse to the second angle so as to plastically deform the plurality of tapes and impart a twist pitch in the plurality of high temperature superconductor tapes. There is a forming member spaced from the second alignment device for receiving the plurality of high temperature superconductor tapes with the imparted twist pitch and forming them into a bundle of high temperature superconductor tapes of the high temperature superconductor tapes with the imparted twist pitch.

In other aspects of the invention, one or more of the following features may be included. The first alignment device may include a plurality of slots oriented at the first angle, each slot supports a corresponding one of the plurality high temperature superconductor tapes as it passes through the first alignment device. The second alignment device may include a plurality of slots oriented at the second angle, each slot supports a corresponding one of the plurality high temperature superconductor tapes as it passes through the second alignment device. The first angle may be oriented at approximately ninety degrees to the second angle. The spacing between the first alignment device and the second alignment device may be adjustable and may be used to control the twist pitch of the plurality of high temperature superconductor tapes. There may further be included a reel supporting each of the plurality of high temperature superconductor tapes, each reel being horizontally disposed such that the wide faces of each of the plurality of high temperature superconductor tapes is vertically disposed. There may also be included a divider disposed between the second alignment device and the forming member for separating each of the plurality of twisted high temperature superconductor tapes as they exit the second alignment device and enter the forming member. The divider may be translucent. There may be included a wrapping device for spirally winding an overwrap around the cable of the high temperature superconductor tapes with the imparted twist pitch. The overwrap may comprise Teflon®. The forming member may include a die.

In another aspect of the invention, there is a method for bundling a plurality of high temperature superconductor tapes into a flexible cable. The method includes receiving and guiding through an alignment device the plurality of high temperature superconductor tapes, each of the tapes arranged side by side with a wide surface of each of the plurality of high temperature superconductor tapes oriented at a first angle. The method also includes receiving and guiding through a second alignment device spaced from the first alignment device the plurality of high temperature superconductor tapes, each of the tapes arranged side by side with the wide surface of each of the plurality of high temperature superconductor tapes oriented at a second angle orthogonal. The first angle being transverse to the second angle so as to plastically deform the plurality of tapes and impart a twist pitch in the plurality of high temperature superconductor tapes. The method also includes receiving, from the second alignment device, the plurality of high temperature superconductor tapes with the imparted twist pitch and forming them into a bundle of high temperature superconductor tapes with the imparted twist pitch.

In yet other aspects of the invention, the following features may be included. The first alignment device may include a plurality of slots oriented at the first angle, each slot supports a corresponding one of the plurality high temperature superconductor tapes as it passes through the first alignment device. The second alignment device may include a plurality of slots oriented at the second angle, each slot supports a corresponding one of the plurality high temperature superconductor tapes as it passes through the second alignment device. The first angle may be oriented at approximately ninety degrees to the second angle. The method may further include adjusting the spacing between the first alignment device and the second alignment device to control the twist pitch of the plurality of high temperature superconductor tapes. The method may also include providing a reel to support each of the plurality of high temperature superconductor tapes, each reel being horizontally disposed such that the wide faces of each of the plurality of high temperature superconductor tapes is vertically disposed. The step of forming may include using a divider to maintain separation of the plurality of twisted high temperature superconductor tapes as they exit the second alignment device. The divider may be translucent. The method may further include spirally winding an overwrap around the cable of the high temperature superconductor tapes with the imparted twist pitch. The overwrap may comprise Teflon®. The step of forming a bundle of high temperature superconductor tapes may include passing the high temperature superconductor tapes through a die.

It is an object of the invention to provide a system and method for bundling a plurality of HTS wires into a flexible power cable.

It is a further object of the invention to provide a system and method for bundling HTS wires which significantly reduces damage to individual wires in the cable, as well as associated labor and manufacturing costs.

DETAILED DESCRIPTION

Figure 1:
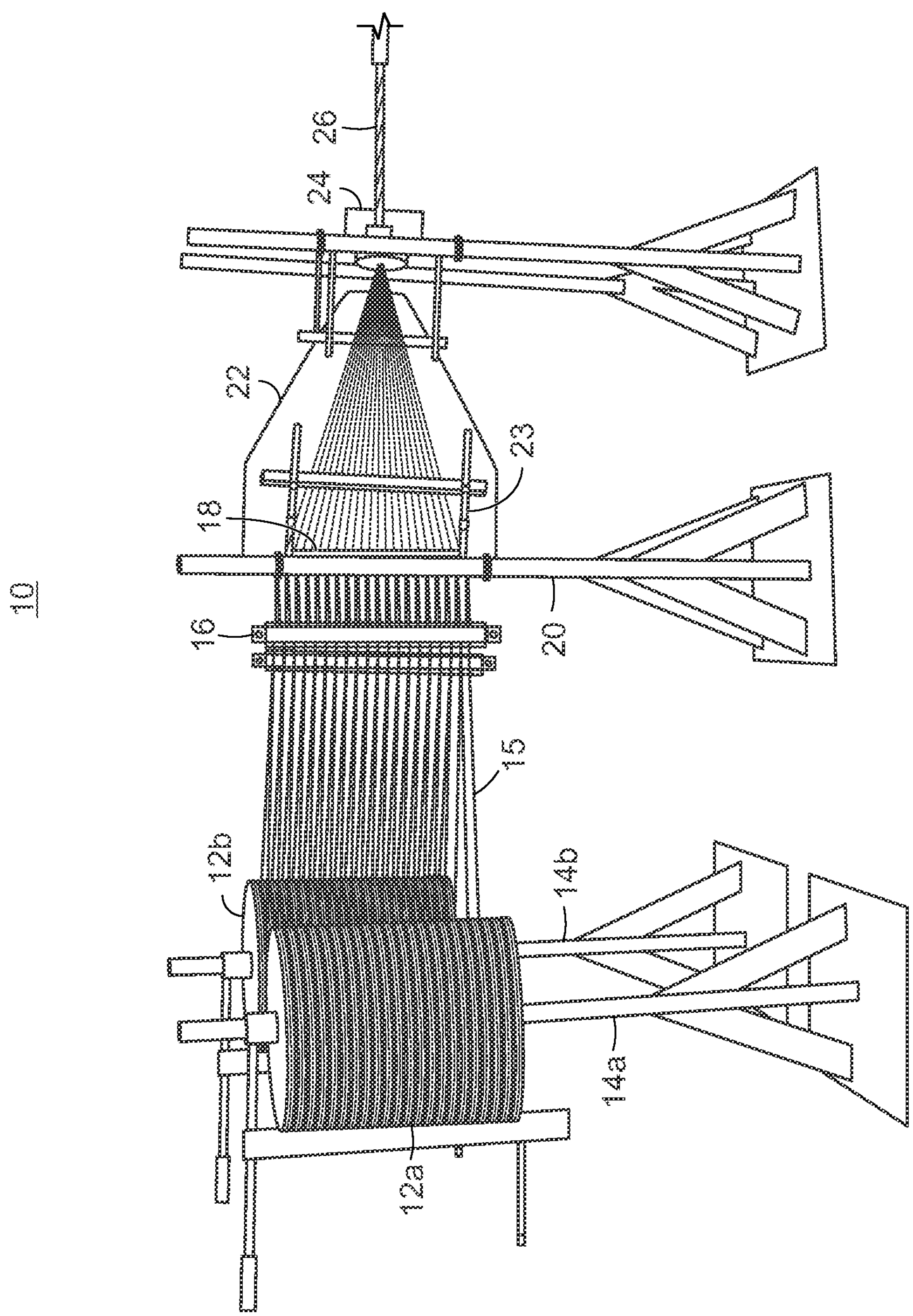
FIG. 1 is a perspective view of the HTS wire bundling system according to this invention.

HTS wire bundling line 10 is shown in FIG. 1 to include two spools of insulated HTS wire 12*a* and 12*b* which are loaded onto the vertical stands 14*a* and 14*b*, respectively. For this particular line, there are forty spools of HTS wire, twenty on each of stacks 12*a* and 12*b*. The HTS wires 15 can be of any type suitable for use in a bundled power cable; however, in this example they are being assembled into a low voltage DC power cable. The individual HTS wires may be insulated with Kapton insulation. In addition, any number of HTS wires can be bundled together based on the particular application and they can be payed off from one stack of spools of HTS wire or multiple stacks of spools. Spools 12*a* and 12*b* may also be arranged in different configurations and/or orientations.

Figure 2:
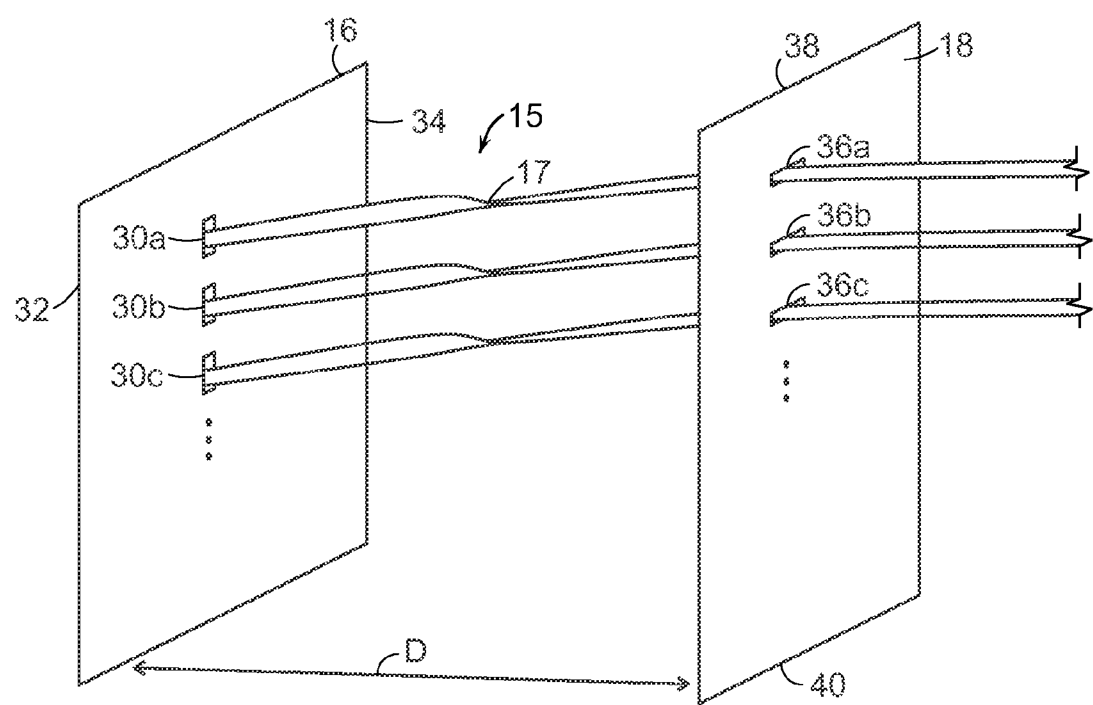
FIG. 2 is a perspective view of the pattern boards of FIG. 1.

As the plurality of HTS wires 15 pay off from first and second spools 12*a* and 12*b*, they are received in and pass through individual slots (one for each HTS wire) in the upstream pattern board 16. Slots 30*a-c* in upstream pattern board 16 are shown in FIG. 2 to be oriented in the same manner as the HTS wires 15 are oriented as they pay off from spools 12*a* and 12*b*, i.e. with the wide surfaces of HTS wires 15 parallel to the left and right edges 32 and 34 of the upstream pattern board 16. The HTS wires are then received by and pass through corresponding individual slots, 36*a-c*, in the twisting pattern board 18. Slots 36*a-c* are oriented such that they are transverse to slots 32*a-c* in the upstream pattern board 16. In other words slots 36*a-c* are oriented such that the HTS wires pass therethrough with the wide surfaces of HTS wires 15 parallel to the top and bottom edges 38 and 40 of the twisting pattern board 18. In this example, slots 32*a-c* and slots 36*a-c* are perpendicular to one another; however, they may be orientated at various angles depending on the application. Moreover, while only three sets of slots in upstream and twisting pattern boards 16 and 18, respectively, this is to simplify the drawing and a corresponding number of slots in each pattern board would be included for the total number of HTS wires 15 used.

As HTS wires 15 pass through the perpendicularly oriented slots in pattern boards 16 and 18 a twist 17, FIG. 2, is imparted in the wires and they plastically deform. Given the angle of twist and the spacing between the pattern boards, a plastic deformation results and creates a permanent twist in HTS wires 15. The distance, "D", between the pattern boards (i.e., the pattern board gap) and the angle of the slots in the upstream pattern board 16 relative to the slots in the twisting pattern board 18 determines the severity of twist in the individual wires, which in turn determines the pitch of the bundle of HTS wires. The two pattern boards may be mounted together on a pattern board stand 20 allowing for the pattern board gap to be adjustable. The smaller the pattern board gap, the tighter the twist. For example, a one inch spacing in the pattern board gap, yields approximately a two foot twist pitch in the finished cable.

Figure 3:
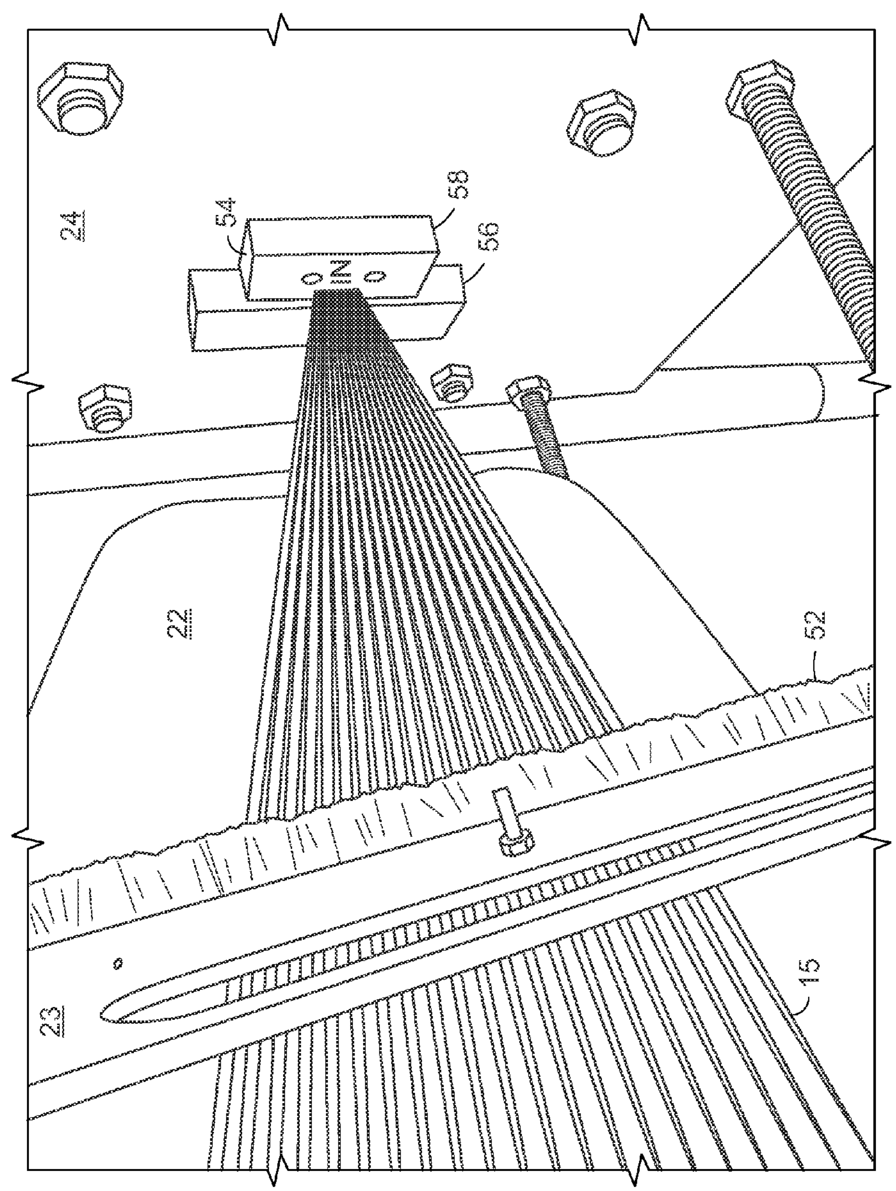
FIG. 3 is a perspective view of plurality of wires entering the forming member.

After exiting the twisting pattern board 18, the plurality of HTS wires continue through bundling line 10, now with an imparted twist, and are physically guided between a divider 22 (FIGS. 1 and 3), which may be made of a translucent material to not only prevent the twisted wire from tangling but to also enable monitoring of both sides of the line by one technician/operator. Support member 23 holds a metallic continuity brush 52, which among other things, imparts a pressure on the wires to maintain them in proximity to the guide board. The individual wires are then consolidated by a forming member 24, such as die 54, FIG. 3. The wires exit the forming member 24 as a formed bundle 26 with the desired cross-section and twist pitch.

Metallic continuity brush 52 is also used as part of an insulation break detection system to identify damage to the Kapton insulation in the HTS wires while forming the bundle. The brushes may be located at different locations along line 10 specifically to inspect the HTS wires as they change orientation while moving through the bundling line. A final brush 60, FIG. 4, monitors the formed bundle 26 at the exit of die 54. Although there are only two brushes described herein, additional brushes may be included at different locations along line 10. The brushes are connected to circuits which may be used to detect and alert an operator to damage to insulation in the HTS wires so that the issue can be corrected before the bundling process is complete.

Figure 4:
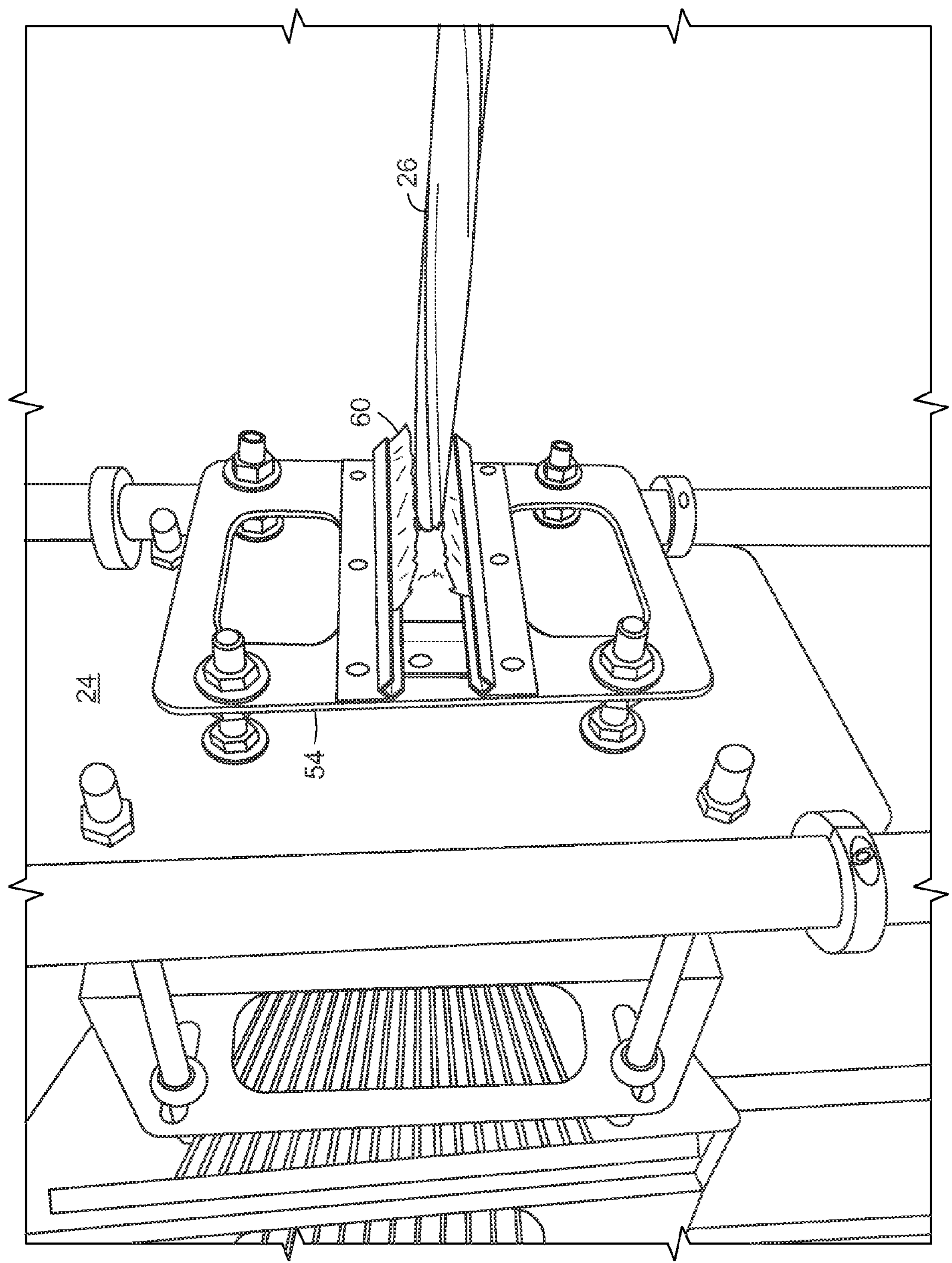
FIG. 4 is a perspective view of plurality of wires exiting the forming member in a bundle.

Die 54 includes die half 56 and die half 58 each having an aperature sized and shaped such that when they are brought together they form an opening to provide the desired bundle shape and size as HTS wires 15 exit die 54 to form bundle 26 as shown in FIG. 4. The spacing between the die half 56 and 58 may be adjustable to change the size of bundle 26.

Figure 5:
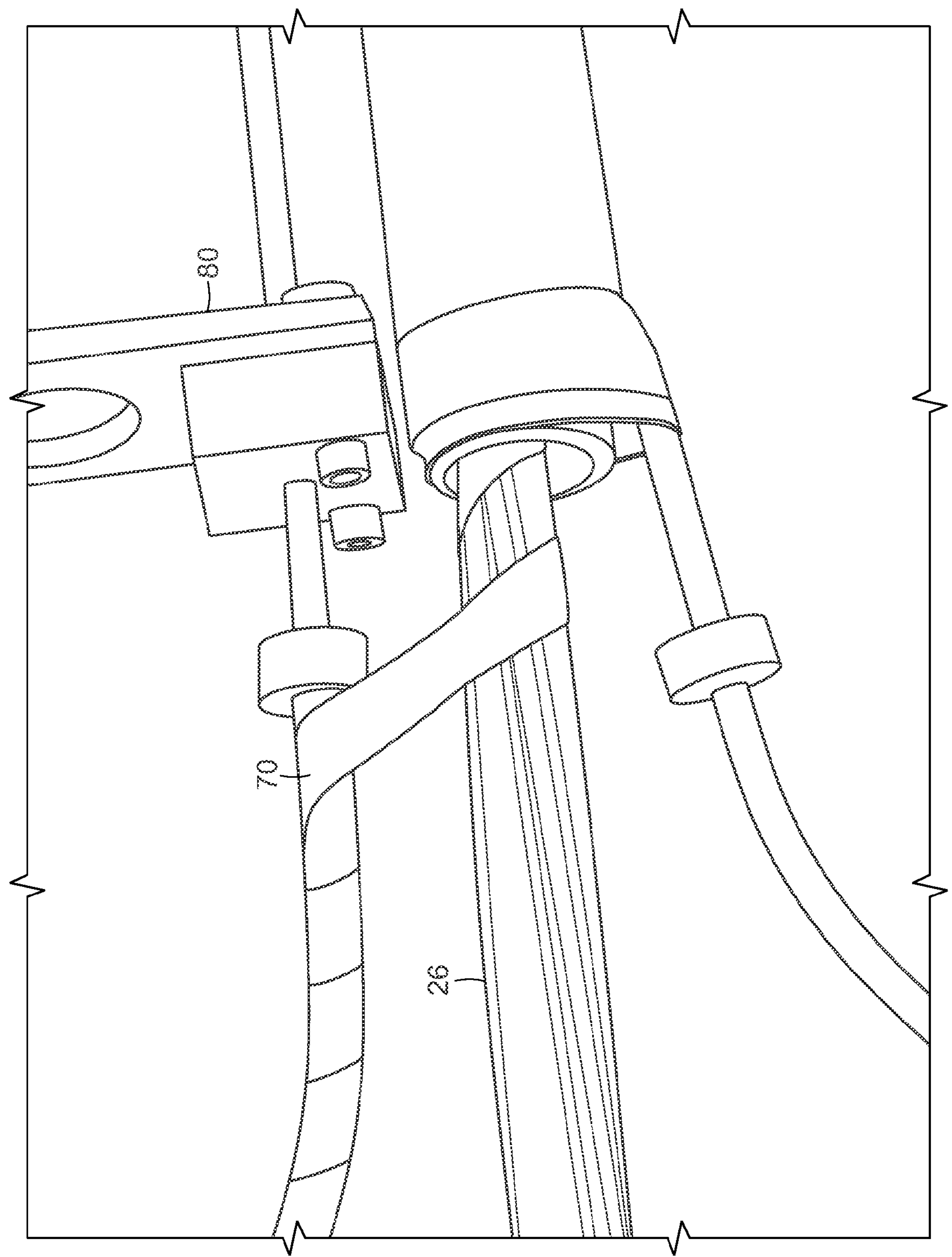
FIG. 5 is a perspective view of the wire bundle being wrapped in Teflon®.

Formed bundle 26 is then provided with an overwrap 70, FIG. 5 (e.g. Teflon®) as it exits die 54. The bundle 26 enters the wrapping machine 80 (only a portion of which is shown) where the overwrap is applied such that it is spirally wrapped around bundle 26. With one possible configuration of the wrapping machine 80, the wrap may be fed from a rotating tape head/spool which uniformly guides the overwrap around the bundle 26 in a spiral pattern. The tape head rotates around the bundle 26 so as to ensure the wrapping angle remains constant during the process. The spirally applied overwrap 70 maintains the HTS wires in a bundle while allowing it to be sufficiently flexed for spooling and later use in various applications.

After bundle 26 has been spirally wrapped in may then be mechanically and electrically tested and spooled in the desired manner.

What is claimed is:

1. A system for bundling a plurality of high temperature superconductor tapes into a flexible cable, comprising:

A first alignment device for receiving and guiding there through the plurality of high temperature superconductor tapes, each of said tapes arranged side by side with a wide surface of each of the plurality of high temperature superconductor tapes oriented at a first angle;

A second alignment device spaced from the first alignment device for receiving and guiding there through the plurality of high temperature superconductor tapes, each of said tapes arranged side by side with the wide surface of each of the plurality of high temperature superconductor tapes oriented at a second angle, the first angle being transverse to the second angle so as to plastically deform the plurality of tapes and impart a twist pitch in the plurality of high temperature superconductor tapes; and A forming member spaced from the second alignment device for receiving the plurality of high temperature superconductor tapes with the imparted twist pitch and forming them into a bundle of high temperature superconductor tapes of said high temperature superconductor tapes with the imparted twist pitch.

2. The system of claim 1 wherein the first alignment device includes a plurality of slots oriented at the first angle, each slot supports a corresponding one of the plurality high temperature superconductor tapes as it passes through the first alignment device.

3. The system of claim 2 wherein the second alignment device includes a plurality of slots oriented at the second angle, each slot supports a corresponding one of the plurality high temperature superconductor tapes as it passes through the second alignment device.

4. The system of claim 3 wherein the first angle is oriented at approximately ninety degrees to the second angle.

5. The system of claim 4 wherein the spacing between the first alignment device and the second alignment device is adjustable and is used to control the twist pitch of the plurality of high temperature superconductor tapes.

6. The system of claim 4 further including a reel supporting each of the plurality of high temperature superconductor tapes, each reel being horizontally disposed such that the wide faces of each of the plurality of high temperature superconductor tapes is vertically disposed.

7. The system of claim 3 further including a divider disposed between the second alignment device and the forming member for separating each of the plurality of twisted high temperature superconductor tapes as they exit the second alignment device and enter the forming member.

8. The system of claim 7 wherein the divider is translucent.

9. The system of 7 further including a wrapping device for spirally winding an overwrap around the cable of the high temperature superconductor tapes with the imparted twist pitch.

10. The system of 9 wherein the overwrap comprises Teflon®.

11. The system of 1 wherein the forming member includes a die.

12. A method for bundling a plurality of high temperature superconductor tapes into a flexible cable, comprising:

receiving and guiding through an alignment device the plurality of high temperature superconductor tapes, each of said tapes arranged side by side with a wide surface of each of the plurality of high temperature superconductor tapes oriented at a first angle;

receiving and guiding through a second alignment device spaced from the first alignment device the plurality of high temperature superconductor tapes, each of said tapes arranged side by side with the wide surface of each of the plurality of high temperature superconductor tapes oriented at a second angle orthogonal, the first angle being transverse to the second angle so as to plastically deform the plurality of tapes and impart a twist pitch in the plurality of high temperature superconductor tapes; and receiving, from the second alignment device, the plurality of high temperature superconductor tapes with the imparted twist pitch and forming them into a bundle of high temperature superconductor tapes with the imparted twist pitch.

13. The method of claim 12 wherein the first alignment device includes a plurality of slots oriented at the first angle, each slot supports a corresponding one of the plurality high temperature superconductor tapes as it passes through the first alignment device.

14. The method of claim 13 wherein the second alignment device includes a plurality of slots oriented at the second angle, each slot supports a corresponding one of the plurality high temperature superconductor tapes as it passes through the second alignment device.

15. The method of claim 14 wherein the first angle is oriented at approximately ninety degrees to the second angle.

16. The method of claim 15 further including adjusting the spacing between the first alignment device and the second alignment device to control the twist pitch of the plurality of high temperature superconductor tapes.

17. The method of claim 15 further including providing a reel to support each of the plurality of high temperature superconductor tapes, each reel being horizontally disposed such that the wide faces of each of the plurality of high temperature superconductor tapes is vertically disposed.

18. The method of claim 14 wherein the step of forming includes using a divider to maintain separation of the plurality of twisted high temperature superconductor tapes as they exit the second alignment device.

19. The method of claim 18 wherein the divider is translucent.

20. The method of claim 18 further including spirally winding an overwrap around the cable of the high temperature superconductor tapes with the imparted twist pitch.

21. The method of claim 20 wherein the overwrap comprises Teflon®.

22. The method of claim 13 wherein the step of forming a bundle of high temperature superconductor tapes includes passing the high temperature superconductor tapes through a die.

* * * * *